Figure 4:
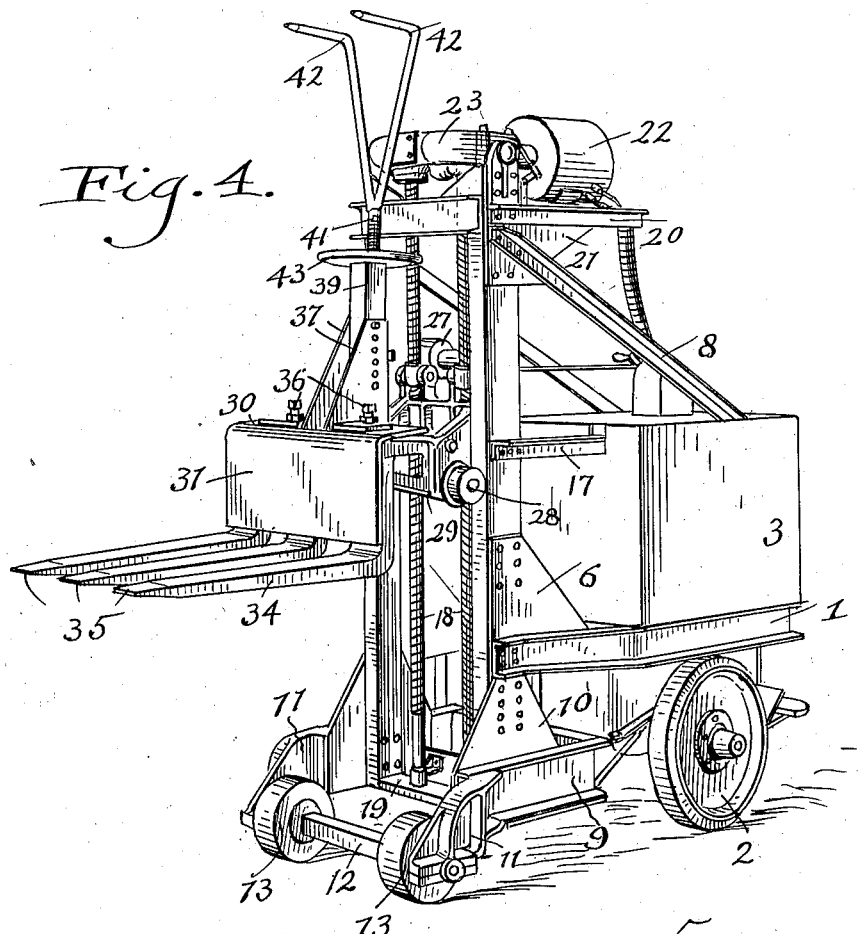

Dec. 1, 1925.
H. T. PLEINES
INDUSTRIAL TRUCK
Filed Dec. 7, 1922
1,563,650
4 Sheets-Sheet 1
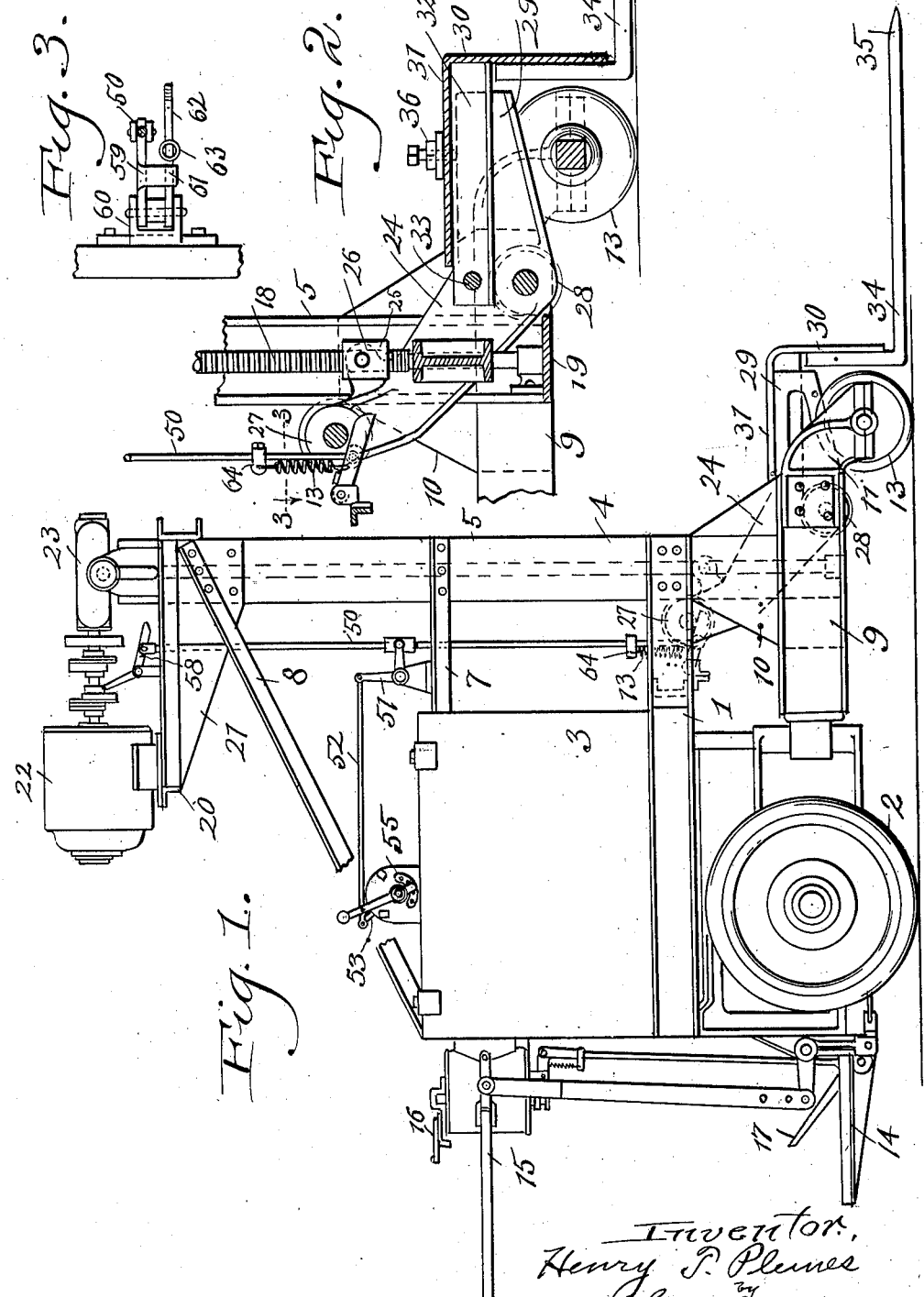
Inventor,
Henry T. Pleines
by
Thurston Hurst Hudson
attys.

Dec. 1, 1925.

H. T. PLEINES

INDUSTRIAL TRUCK

Filed Dec. 7, 1922

1,563,650

4 Sheets-Sheet 2

Dec. 1, 1925.

H. T. PLEINES

INDUSTRIAL TRUCK

Filed Dec. 7, 1922

1,563,650

4 Sheets-Sheet 3

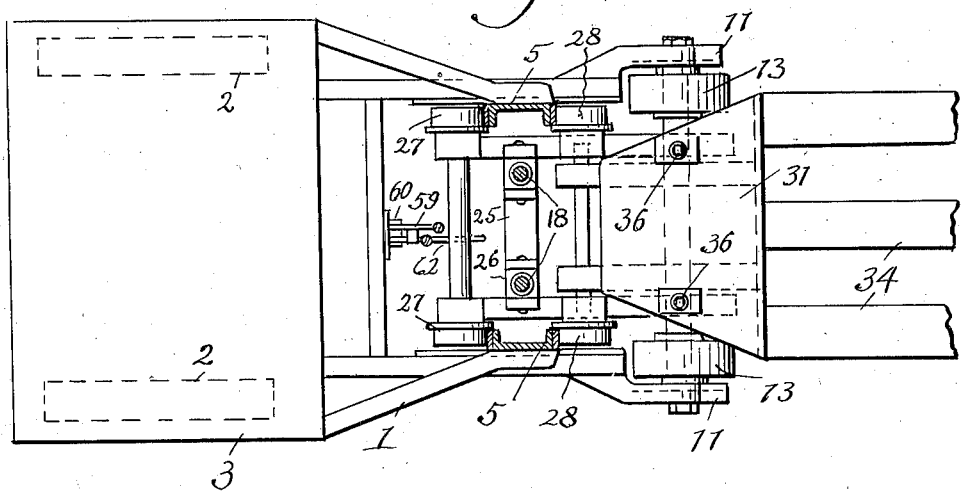
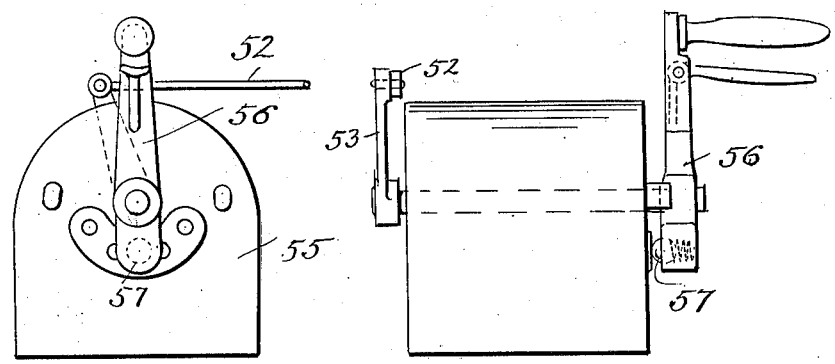

Patented Dec. 1 1925.

1,563,650

UNITED STATES PATENT OFFICE.

HENRY T. PLEINES, OF CLEVELAND, OHIO, ASSIGNOR TO THE LAKEWOOD ENGINEERING COMPANY, OF LAKEWOOD, OHIO, A CORPORATION OF OHIO.

INDUSTRIAL TRUCK.

Application filed December 7, 1922. Serial No. 605,376.

*To all whom it may concern:*

Be it known that I, HENRY T. PLEINES, a citizen of the United States, residing at Cleveland, in the county of Cuyahoga and State of Ohio, have invented a certain new and useful Improvement in Industrial Trucks, of which the following is a full, clear, and exact description.

The present invention relates to trucks, which are commercially known as industrial trucks and is of the type in which the truck may be used not only as a lifting truck for transferring loads from one point to another, but also as a tiering truck for elevating the material to pile the same.

The present invention is an improvement over the truck covered by the Pleines Patent No. 1,432,299, granted Oct. 17, 1922.

An object of the present invention is to provide a self-propelled truck which may be used either as a lifting or as a tiering truck and in which the load receiving platform can be lowered into contact with the supporting surface so that articles can be taken up directly from the floor without the use of loading skids or platforms.

A further object is to so mount the elevating mechanism upon the truck that the load receiving platform is entirely beyond the end of the truck but is effectively counterbalanced by the heavy portions of the truck.

A further object is to provide a mounting for the load receiving platform which will permit the platform to yield and avoid injury to the platform should it strike against an obstruction as it is being lowered to the supporting surface.

A further object is to provide a means for varying the angle at which the platform is supported.

A further object is to provide a platform so constructed that it can be readily shoved under an article resting directly on the supporting surface.

A further object is to provide in connection with the load receiving platform, a releasable load retaining member which can be adjusted for loads of various sizes.

A further object is to provide a load receiving platform, the width of which may be varied for handling different kinds of loads.

A further object is to provide an improved control for the elevating mechanism in which the movement of the carriage may be controlled either by hand or by limit stops engageable with the carriage and which will permit additional movement to be imparted to the carriage after the operation of a limit stop.

Other objects will be apparent from the following description in connection with the accompanying drawing.

Figure 5:
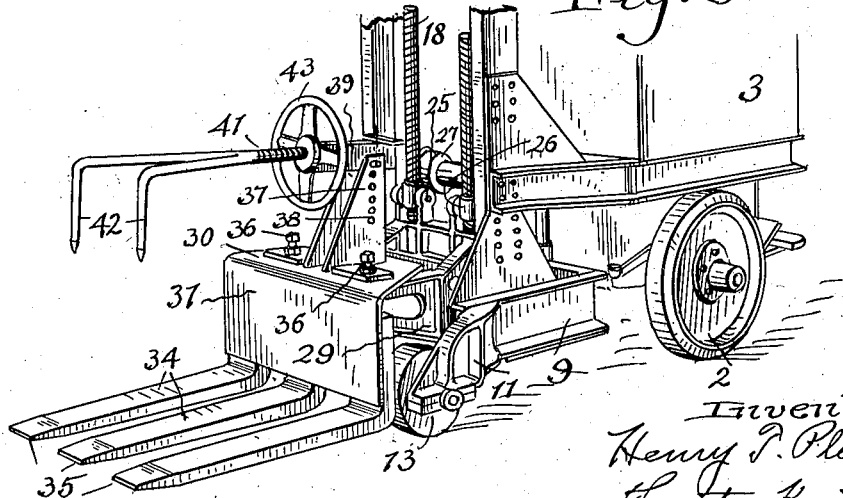
Figure 6:
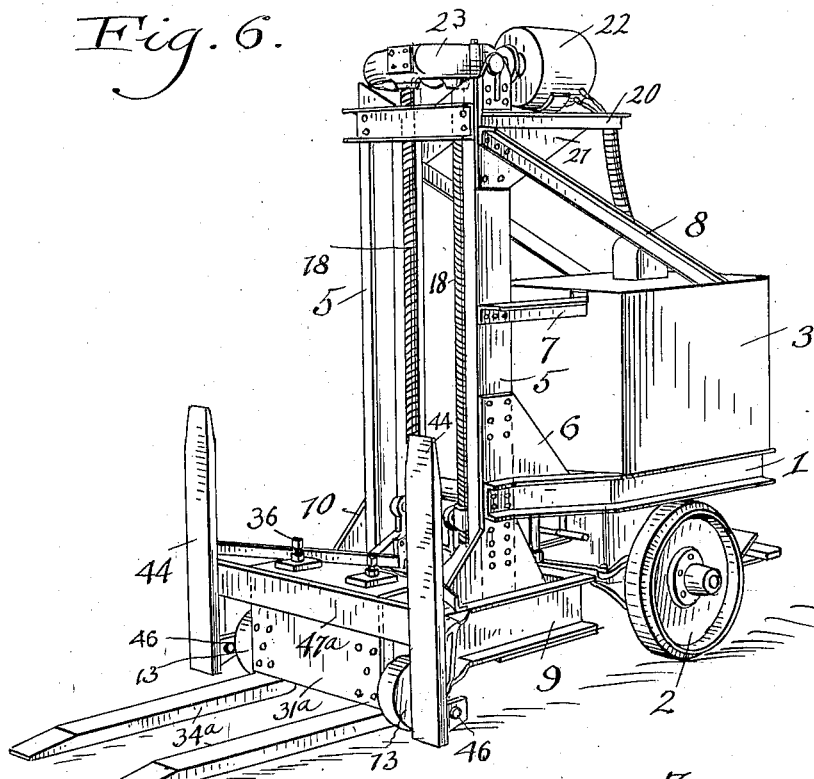
Figure 7:
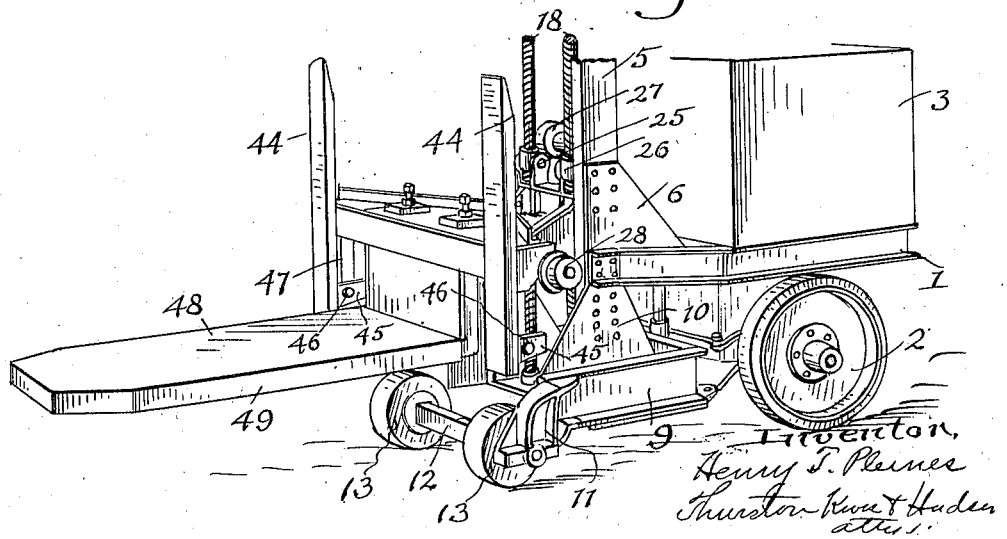

Reference should be had to the accompanying drawing forming a part of this specification in which Fig. 1 is a side elevation of the improved truck; Fig. 2 is a fragmentary vertical section through the lower rear portion of the truck; Fig. 3 is a section on line 3—3 of Fig. 2; Fig. 4 is a perspective view of the truck with the platform in an elevated position; Fig. 5 is a fragmentary perspective showing the platform in lowermost position; Fig. 6 is a perspective view showing a modified platform structure; Fig. 7 is a fragmentary perspective showing a detachable cover plate secured in place upon the platform tines; Fig. 8 is a horizontal section through the guide standard above the body of the truck showing a plan view of the truck and platform; Figs. 9 and 10 are end and side elevations respectively of the controller for the elevating motor.

Referring to the accompanying drawings, the truck has a main U-shaped frame 1 formed from a channel bar, the flanges of which project outwardly, the main frame 1 being supported by wheels 2 which are power driven and pivoted to swing about a vertical axis to guide the truck as is common in the art. The closed end of the U-frame 1 is at the front of the truck over the suporting wheels 2 and has mounted thereon a housing 3 within which are mounted the driving motor for the truck and the storage battery. The ends of the U-frame 1 are bent inwardly at the open rear end of the frame and a guide standard 4 is secured within the open end of the frame. The guide standard 4 comprises vertical channel iron posts 5 which are secured within the ends of the frame 1 with their flanges extending inwardly. The posts 5 are braced by means of gusset plates 6 at their point of connection with the frame 1 and also by means of horizontal rails 7 connected to the upper portion of the housing 3 and to the posts 5 and inclined braces 8 extending from the front end of the housing 3 to adjacent the upper ends of the posts 5. The lower ends of the posts 5 project beneath the main frame 1 and are rigidly secured to an auxiliary U-frame 9 formed of channel iron and having its open end toward the rear. The auxiliary frame 9 is braced by gusset plates 10 secured thereto and has bearing brackets 11 secured to the rear end thereof. An axle 12 carrying small supporting wheels 13 is journaled at its ends in the bearing brackets 11. The truck has the usual operator's platform 14 at the front end thereof, above which are mounted the steering, motor control and brake levers 15, 16 and 17, respectively, by means of which the movements of the truck are controlled.

Two vertical screws 18 are journaled in thrust bearings in the lower cross bar 19 of the standard 4 and at their upper ends in suitable bearings carried by a platform 20 supported by gusset plates 21 from the posts 5 of the guide standard. The platform 20 supports a motor 22 which drives the screws 18 through worm gearing in the housing 23 at the upper ends of the screws. A carriage 24 is mounted for vertical movement upon the guide standard 4 and is connected by pivot hangers 25 to nuts 26 in threaded engagement with the vertical screws 18. The carriage 24 is positioned between the posts 5 of the guide standard and the portion thereof between the posts 5 is inclined upwardly toward the front of the truck and carries upon opposite sides thereof flanged wheels 27 and 28 which travel upon the front and rear faces respectively of the posts 5. The carriage 25 has integral arms 29 extending rearwardly therefrom and terminating directly over the rear supporting wheels 13 of the truck. The load carrying member indicated generally by the numeral 30 is supported upon the rearwardly extending arms 29 of the carriage 24. At its front end the load carrying member 30 has an angle plate 31, one of the angular portions of which extends over the tops of the arms 29 and the other angular portion of which extends downwardly at the rear of the supporting arms. The angle plate 31 is carried by angle bars 32 which extend alongside the upper portions of the arms 29 of the carriage and are connected thereto by means of a horizontal pivot 33. The depending portion of the angle plate 31 carries the load receiving platform which is in the form of rearwardly extending tines 34 which have upturned rear ends secured to the rear face of the plate 31 and which when the carriage is in its lowermost position, are adapted to rest upon the floor or other supporting surface over which the truck moves. The tines 34 have beveled points 35 so that they can be readily shoved under a box, bale or other article resting upon the floor. The pivotal connection between the carriage and the load carrying member permits the platform to swing upwardly so that the load carrying member will not be injured in case the platform should be lowered upon an article resting upon the floor. In order that the platform may be adjusted angularly, the plate 31 carries set screws 36, the lower ends of which bear upon the upper faces of the arms 29. By means of the set screws 36, the angle of the platform with respect to the supporting surface can be adjusted somewhat if desired. Upon the horizontal portion of the angle plate 31 are supported upwardly extending brackets 37, which are provided with a vertical row of apertures 38. A block 39 is pivoted between the brackets 37 by means of a pivot pin 40 which may be passed through any one of the apertures 38. The block 39 receives the threaded shank of a forked load engaging member 41 which has downwardly extending prongs 42 at its outer end and carries a hand wheel nut 43 by means of which the member 41 may be adjusted in or out of the block 39. The load engaging member 41 is adapted to be swung to vertical position as shown in Fig. 4 while articles are being loaded upon or taken from the platform. The load retaining member can be adjusted vertically in the brackets 37 to the proper height for engaging the load and may be extended by means of the hand wheel 43 to the proper length for engaging the load adjacent the outer end of the platform.

In Figs. 6 and 7 of the drawing a slightly modified form of load carrying member is shown. In this modification the angle plate 31$^a$ is narrower and the depending portion thereof extends between the rear wheels 13 of the truck. A pair of tines 34$^a$ are secured to the depending portion of the plate 31$^a$ in the same manner as the tines 34 above described. A pair of outer tines 44 are supported outside the wheels 13 and have brackets 45 fixed to their rear ends which are connected by means of pivots 46 to depending posts 47 which are carried by cross bars 47$^a$ secured to the plate 31$^a$. The brackets 45 on the tines 44 straddle the posts 47 to which they are pivotally connected so that the rear ends of the tines 44 bear against the bottoms of the posts 47 and are rigidly held in horizontal position. When desired, however, the tines 44 can be swung to vertical position against the cross bar 47$^a$ and secured in this position when it is desirable to use the center prongs 34$^a$ only. Fig. 7 of the drawing shows a cover plate 48 having side flanges 49 which fit against the side edges of the center tines 34$^a$. The plate 48 may be used as a loading platform upon which the load is piled and under which the tines 34$^a$ may be inserted to lift the load or it may be placed directly upon the tines 34ª and the load may be then placed thereon.

A vertically disposed controlling rod 50 is mounted between the housing 3 and the guide standard 4. At its central portion the rod 50 is pivotally connected to a bell crank lever 51 supported by a bracket on the rails 7 and connected by means of a connecting rod 52 to an arm 53 fixed to the shaft 54 of a controller for the motor 22. The shaft 54 extends through a controller case 55 and carries upon its opposite end a hand lever 56 which has a ball ratchet 57 engageable with notches in the face of the controller case 55 to yieldably hold the lever in adjusted position. The upper end of the rod 50 is connected to a trip arm 58 which is pivotally supported upon a fixed part of the frame and has its free end disposed in the path of one of the rollers 27 of the carriage. The lower end of the rod 52 is pivotally connected to an arm 59 which is pivoted to a bracket 60 upon a fixed part of the frame and has a laterally projecting lug 61. The trip lever 62 is pivoted at one end to the bracket 60, extends beneath the lug 61 on the arms 59 and has its free end positioned in the path of one of the carriage wheels 27 adjacent the lower portion of the standard 4. A coil spring 63 is connected at its lower end to the trip lever 62 and at its upper end to a clip 64 fixed to the rod 50. The hand lever 56 may be shifted from neutral position rearwardly or forwardly to cause the motor 22 to operate in a direction to raise or lower the carriage 24. If the lever 56 has been shifted in a direction to cause the load to be elevated, the operator can stop the motor when the platform has reached the desired height, or if he does not stop the motor, one of the wheels 27 will strike the trip lever 58 adjacent the upper end of the standard, lifting the control lever 50 and shifting the controller to neutral position, the ball ratchet 57 serving to normally hold the lever 56 in adjusted position but yielding when a strong thrust is exerted on the lever. When the carriage 24 is moving downwardly it will strike the trip lever 62 adjacent the lower end of the guide standard and exert a pull through the spring 63 sufficient to move the controlling rod 50 downwardly and to move the controller to neutral position. If, however, the operator desires to lower the platform further he can pull the lever 56 forwardly and elevate the rod 50 in opposition to the spring 63. Such movement of the control lever, however, will cause the tension of the spring 63 to be increased so that upon release of the lever 56 the motor 22 will be instantly stopped. This quick return movement enables the operator to lower the carriage to exactly the position he desires when lowering the platform to the floor. Since the guide standard 4 is mounted on the truck between the front and rear wheels thereof, the truck forms a stable support for the load carrying member. The front portions of the truck carrying the motor and storage battery act as a counterbalance for the load carrying member, but, if necessary additional weights may be placed within the housing 3.

Having described my invention, I claim:

1. In a truck, a frame having front and rear supporting wheels, a guide standard fixed to the frame toward the rear end thereof, a carrier movable upon said standard and guided thereby, said carrier having a rearwardly projecting portion extending downwardly at the rear end of the frame and adapted to straddle the rear supporting wheels, said rearwardly projecting portion terminating in a load receiving platform adapted to be moved into close proximity to the supporting surface, and means for raising and lowering the carrier.

2. A truck, comprising a main frame, supporting wheels therefor, a guide standard rigidly secured to the rear end of said main frame, said standard projecting beneath said main frame, an auxiliary frame rigidly secured to the lower end of the standard, small supporting wheels mounted upon said auxiliary frame, a load receiving platform wholly at the rear of said auxiliary frame and adapted to be lowered at the rear of said auxiliary frame into close proximity to the supporting surface, means for supporting and guiding said platform upon said standard, and means for raising and lowering said platform.

3. A truck, comprising a frame, front and rear supporting wheels therefor, an upright guide standard fixed to said frame intermediate said front and rear wheels, a carrier mounted for movement on said standard and supported thereby, said carrier having rearwardly and downwardly extending portions overhanging the rear end of the frame and terminating in a load receiving platform adapted to be lowered into contact with the supporting surface, and means for raising and lowering said carrier.

4. A truck, comprising a frame, front and rear supporting wheels therefor, a guide standard fixed to the frame intermediate the front and rear wheels, a carriage mounted for movement on said standard and guided thereby, said carriage having a portion extending rearwardly to the rear end of said frame, a platform secured to said carriage, said platform having an upturned connecting portion depending from the rear end portion of the carrier at the rear of the frame whereby said platform can be lowered substantially to the supporting surface, and means for raising and lowering the carriage.

5. A truck, comprising a frame, front and rear supporting wheels therefor, a vertical guide standard carried by the frame intermediate the front and rear wheels, a carrier mounted for movement on said standard and guided thereby, said carrier having a downwardly offset load receiving platform beyond the rear end of the frame adapted to be positioned in close proximity to the supporting surface over which the truck runs, said carrier having a portion adapted to overlie the frame at the rear of said standard, and means for raising and lowering the carrier.

6. A truck, comprising a U-shaped main frame member having its open end to the rear, a guide standard secured between the ends of said frame member and projecting beneath the same, an auxiliary frame, said auxiliary frame being secured to said standard beneath the main frame member, supporting wheels associated with the main frame member, small supporting wheels attached to the auxiliary frame adjacent the standard, a carriage mounted for movement on the standard and through the open rear end of said main frame member, a rearwardly projecting load carrying platform carried by said carriage, said platform being downwardly offset and adapted to move past the rear end of said auxiliary frame, and means for raising and lowering said carriage.

7. In a truck, a frame having a rear portion which is low lying and adjacent the supporting surface for the truck, a guide standard supported upon said rear portion of the frame, small supporting wheels connected to said rear portion of the frame, supporting wheels for the front portion of the frame, a load carrying member mounted to move upon said standard and guided thereby, said member having a supporting portion engaging said standard and a load receiving platform offset downwardly with respect to said supporting portion and lying wholly at the rear of said rear portion of the frame, and means for raising and lowering said load carrying member.

8. In a truck, a frame having a rear portion which is low lying and adjacent the supporting surface for the truck, a vertical guide standard supported upon said rear portion of the frame, small supporting wheels connected to said rear portion of the frame at the rear end thereof, supporting wheels for the front portion of the frame, a guide standard fixed to the rear portion of the frame adjacent said small supporting wheels, a load carrier mounted to move upon said standard and guided thereby, said load carrier having a downwardly offset load receiving platform wholly in the rear of said rear wheels, and adapted to be lowered behind said wheels into close proximity to the supporting surface, and means for raising and lowering said load carrier.

9. A truck comprising a main frame member, supporting wheels therefor, an auxiliary frame member spaced from said main frame member beneath the same and projecting rearwardly beyond the rear end thereof, supporting wheels attached to the rear end of said auxiliary frame member, a guide standard secured to the rear end of said main frame member and at its lower end to said auxiliary frame member, a carriage movable on said standard to positions above and below said main frame member, a load receiving platform carried by the carriage and projecting rearwardly therefrom, said platform having a downwardly offset load receiving portion beyond the rear end of said auxiliary frame, and means for raising and lowering said carriage.

10. A truck, comprising a frame, front and rear supporting wheels therefor, a vertical standard adjacent the rear end of said frame, a carriage mounted for movement on said standard, a rearwardly extending platform pivotally connected to said carriage to swing vertically, said platform having a load receiving portion offset downwardly from its pivotal connection with the carriage, and means for raising and lowering said carriage.

11. A truck comprising a frame, front and rear supporting means therefor, a vertical standard adjacent the rear end of said frame, a carriage mounted for movement on said standard, said carriage having a portion extending rearwardly to the rear end of the frame, a load receiving member having a portion overlying said rearwardly extending portion of the carriage and attached thereto, a portion extending downwardly over the rear end of said carriage and a rearwardly projecting load receiving platform, and means for raising and lowering said platform.

12. A motor driven elevating truck, comprising a supporting frame, front and rear supporting wheels therefor, a guide standard adjacent the rear end of said truck, a carriage movable upon said standard, a platform pivoted to and projecting rearwardly from said carriage and adapted to be lowered into contact with the supporting surface at the rear of said truck and means for raising and lowering said platform.

13. A truck, comprising a supporting frame, front and rear supporting wheels therefor, a guide standard adjacent the rear end of said truck, a carriage movable upon said standard, a platform projecting rearwardly from said carriage and adapted to be lowered into contact with the supporting surface at the rear of the truck, said platform being yieldably mounted on said carriage, and means for raising and lowering said platform.

14. A truck, comprising a main frame member, supporting wheels therefor, a guide standard secured to the rear end of the main frame member and projecting beneath the same, an auxiliary frame secured to the lower end of said standard and projecting beyond the rear end of said main frame member, supporting wheels at the rear end of said auxiliary frame, a carriage mounted for movement on said standard to positions above and below said main frame member, said carriage having a portion extending rearwardly to the end of the auxiliary frame, a load carrying member having a portion overlying said rearwardly extending portion of the carriage and pivoted thereto to swing about a horizontal axis, a portion depending over the rear end of said carriage and a platform projecting rearwardly from the depending portion, and means for raising and lowering the carriage.

15. In a motor driven truck, the combination with the wheel supported frame, of a guide standard supported forwardly of the rear end of said frame, a carriage mounted for movement on said standard, a load carrying member connected by a horizontal pivot to said carriage, said load carrying member having a portion overhanging the rear end of the truck frame and engageable with the supporting surface, and means for raising and lowering said carriage.

16. In a truck, the combination with the wheel supported frame, of a guide standard mounted thereon, a load carrier mounted for movement on said standard, said carrier having a load receiving platform movable from adjacent the supporting surface to elevated positions above the body of the truck, means for raising and lowering said carrier, means for driving said raising and lowering means, and means for controlling said driving means comprising a shiftable member, a hand lever connected thereto and upper and lower carrier engaging members adapted to shift said shiftable member when said carrier reaches predetermined upper and lower positions, one of said carrier engaging members being yieldable with respect to said shiftable member whereby additional movement may be imparted to the carrier by shifting said hand lever.

17. An elevating truck, comprising a wheel supported frame, a guide standard carried thereby, a carriage mounted for movement on the standard, raising and lowering means for said standard, driving means for said raising and lowering means, a shiftable stop device, a hand lever connected thereto, upper and lower trip arms connected with said stop device and engageable with the carriage adjacent the upper and lower ends of the standard, the lower of said trip arms having a spring connection with said stop device whereby said hand lever may be actuated to impart additional lowering movement of said carriage.

18. In an elevating truck, a wheel supported frame, a guide standard carried by the frame, a rearwardly extending load supporting platform supported for vertical movement from said standard, a load engaging member having a depending load engaging portion at its outer end, and means for pivotally securing the inner end of said member adjacent the standard at various heights above the platform.

19. In an elevating truck, a wheel supporting frame, a guide standard carried by the frame, a rearwardly extending platform supported for vertical movement from said standard, an extensible load engaging member having a downturned outer end portion adapted to engage the load, and means for pivotally supporting said load engaging member at its inner end at various heights above the platform to swing vertically.

20. In a motor driven elevating truck, the combination with a wheel supporting frame having a guide standard adjacent its rear end and a carriage mounted for movement on said standard and guided thereby, of a load carrying member secured to said carriage, said load carrying member having a portion overhanging the rear end of the frame when the carriage is in lowermost position and a rearwardly extending platform extending rearwardly from said overhanging portion, said platform being engageable with the supporting surface and comprising spaced tines having tapered ends to facilitate the entry thereof beneath articles on the supporting surface.

21. In a truck, the combination with a wheel supported frame having a guide standard adjacent the rear end thereof, of a carriage mounted for movement on said standard, said carriage having a portion extending rearwardly to adjacent the rear end of said frame, a load carrying member connected at its front end by a horizontal pivot to said carriage adjacent the standard, said load carrying member having a portion overlying the rearwardly extending portion of the carriage, a portion depending over the rear end of said carriage and a load receiving platform extending rearwardly from said depending portion, and adjustable means acting between said carriage and overlying portion of the load carrying member to vary the angle at which said platform is supported.

22. In a truck, the combination with a wheel supported frame having a guide standard adjacent its rear end, of a load carrying member supported and guided for vertical movement from said standard, said member having a portion at the rear of the standard adapted to overhang the rear of said frame, and a rearwardly extending platform at the lower end of said overhanging portion, said platform comprising a series of spaced tines certain of said tines being connected to the overhanging portion by means of horizontal pivots and foldable to upright position against said overhanging portion.

23. In a truck, the combination with a wheel supported frame having a guide standard adjacent its rear end, of a load carrying member supported from said standard and movable vertically thereon, said load carrying member having a portion extending rearwardly from the standard and having a downwardly offset portion adapted to overhang the rear end of said frame, and terminating in a rearwardly extending load receiving platform, said platform comprising a series of spaced tines, the outer of said tines being pivotally connected to the overhanging portion and foldable to upright position against said overhanging portion.

24. In a truck, the combination with a wheel supported frame having a guide standard adjacent its rear end, of a load carrying member supported from said standard and guided thereby for vertical movement from adjacent the supporting surface to an elevated position above said frame, said load carrying member having a downwardly offset load receiving platform adapted to be moved into engagement with the supporting surface at the rear of the truck, said platform comprising spaced tines and a cover plate adapted to be detachably secured to the tines.

In testimony whereof, I hereunto affix my signature.

HENRY T. PLEINES.